United States Patent [19]

Koppenstein et al.

[11] Patent Number: 5,735,543
[45] Date of Patent: Apr. 7, 1998

[54] INSTRUMENT PANEL ARRANGEMENT FOR AN INTERIOR OF A MOTOR VEHICLE

[75] Inventors: Harald Koppenstein, Remseck; Van-Hung Guyen, Sindelfingen, both of Germany

[73] Assignee: Mercedes-Benz AG, Stuttgart, Germany

[21] Appl. No.: 645,592

[22] Filed: May 13, 1996

[30] Foreign Application Priority Data

May 15, 1995 [DE] Germany ............. 195 17 782.7

[51] Int. Cl.$^6$ .................... B60R 21/045; B60K 37/00
[52] U.S. Cl. .................... 280/752; 180/90; 296/70
[58] Field of Search .................... 280/752, 751, 280/748; 180/90; 296/70

[56] References Cited

U.S. PATENT DOCUMENTS

| | | | |
|---|---|---|---|
| 1,296,182 | 3/1919 | Hammond | 180/90 |
| 3,834,482 | 9/1974 | Wada et al. | 280/752 |
| 4,723,792 | 2/1988 | Sakamoto et al. | 280/751 |
| 5,479,693 | 1/1996 | Oyama | 180/90 |

FOREIGN PATENT DOCUMENTS

| | | | |
|---|---|---|---|
| 2 259 906 | 6/1974 | Germany . | |
| 27038491A1 | 8/1977 | Germany . | |
| 28 42 453 | 4/1980 | Germany | 180/90 |
| 38067831A1 | 9/1989 | Germany . | |
| 57-59741 | 9/1980 | Japan . | |
| 60-158949 | 10/1985 | Japan . | |
| 4-362415 | 12/1992 | Japan . | |

*Primary Examiner*—Peter C. English
*Attorney, Agent, or Firm*—Evenson, McKeown, Edwards & Lenahan, P.L.L.C.

[57] ABSTRACT

Compactly arranged function elements in a center area of a cockpit instrument panel arrangement of a motor vehicle are combined in a compact reinforcing frame, and at least one energy absorber is arranged in a longitudinal direction of the vehicle between the reinforcing frame and the cross member, thereby preventing any splintering off of the instrument panel arrangement cover and other parts in the case of a passenger's head impact onto the cockpit resulting from a vehicle crash.

14 Claims, 1 Drawing Sheet

INSTRUMENT PANEL ARRANGEMENT FOR AN INTERIOR OF A MOTOR VEHICLE

BACKGROUND AND SUMMARY OF THE INVENTION

This invention relates to a cockpit instrument panel arrangement for an interior of a motor vehicle to which a cross member of motor vehicle supporting structure is assigned. The instrument panel arrangement has a central area in which several function elements are arranged.

Instrument panel arrangements for motor vehicle cockpits are generally known. Such an instrument panel arrangement is arranged in the interior of a motor vehicle below a windshield and, particularly in its central cockpit area, that is, in a center area which is easily accessible from the driver side as well as from the side of the front seat passenger, has an accumulation of function elements, such as switch modules, radio, vehicle computer or similar elements. This relatively compact area of the instrument panel arrangement may, however, endanger the occupants in an accident situation in the case of a head impact of a vehicle occupant because, as a result of the head impact, this area experiences unacceptably high accelerations which may cause a splintering of the instrument panel coverings.

It is an object of the invention to provide an instrument panel arrangement of the initially mentioned type which ensures a sufficient safety for the vehicle occupants.

This object is achieved in that the function elements are combined in a compact reinforcing frame, and that at least one energy absorber is arranged in the longitudinal direction of the vehicle between the reinforcing frame and the cross member. As a result, the head impact energy onto the instrument panel coverings is reduced to acceptable values. The function elements and the cover panel of the instrument panel therefore also no longer experience unacceptable accelerations during a vehicle crash. As a result of the combination of the function elements in a compact reinforcing frame, it is sufficient to use only a single energy absorber which is assigned to the reinforcing frame in order to reduce the accelerations for all function elements. The energy absorber should have a sufficient design with respect to its energy receiving capacity in order to reduce the impact energy still transmitted to the reinforcing frame to such an extent that the accelerations of the function elements are within permissible ranges. By means of the solution according to the invention, it is prevented that excessively accelerated function elements can result in a splintering of the coverings of the instrument panel arrangement which, in turn, may lead to injuries of the vehicle occupants.

According to preferred embodiments of the invention, the energy absorber is fastened to the reinforcing frame on its side facing the cross member. This permits a premounting of the energy absorber to the instrument panel arrangement.

According to a further feature of preferred embodiments of the invention, a honeycomb structure is provided as the energy absorber. This honeycomb structure is particularly suitable for achieving a sufficient energy absorption on the very short paths which are available.

According to a further feature of preferred embodiments of the invention, the honeycomb structure is fitted onto holding pins of the reinforcing frame. As a result, the honeycomb structure can be extremely easily mounted and demounted without the use of additional tools.

Other objects, advantages and novel features of the present invention will become apparent from the following detailed description of the invention when considered in conjunction with the accompanying drawings.

DETAILED DESCRIPTION OF THE DRAWINGS

Figure 1:
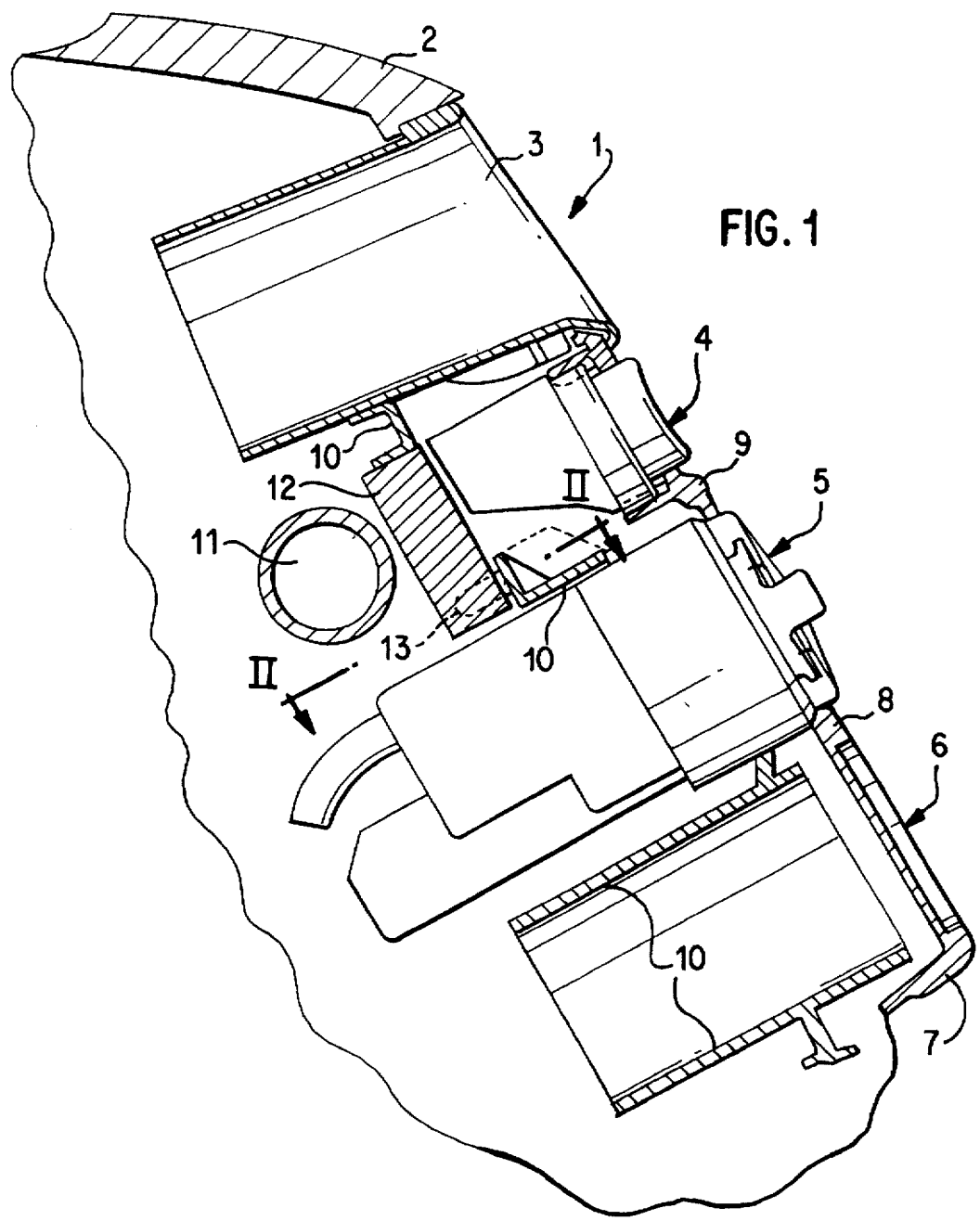
FIG. 1 is a schematic sectional view of an instrument panel arrangement constructed according to a preferred embodiment of the invention in a central area in which a compact arrangement of function elements is provided.

An instrument panel arrangement 1 according to FIG. 1 is arranged in an interior of a passenger car in an area below a windshield. The instrument panel arrangement 1 extends along the whole width of the passenger compartment of the passenger car and has a driver-side area with various indicating instruments in the area of the steering wheel as well as a front-passenger-side area which is provided with a glove compartment and possibly with an air bag for the front seat passenger.

Between the driver-side area and the front-passenger-side area, a center area of the instrument panel arrangement 1 is provided which is accessible from the driver side as well as from the front passenger side. This center area is provided with a plurality of functions which are divided into sections situated below one another. Adjoining a top side 2, the center area first has a center nozzle outlet 3. This is adjoined in the downward direction by a switch section 4 with several switch modules. This switch section 4, in turn, is adjoined in the downward direction by a heating and air-conditioning system section 5 which has various control and regulating elements for the heating and air-conditioning system of the motor vehicle. The heating and air-conditioning system section 5 is adjoined in the downward direction by a radio section 6 which is used for receiving a radio, a vehicle computer or the like.

Toward the front, that is, facing into the vehicle interior, these function sections are provided with covering panels 7, 8, 9 which cover free edge areas of the various function sections in an aesthetically attractive manner. The covering panels 7, 8, 9, viewed in the longitudinal direction of the vehicle, extend behind the respective assigned function elements in their edge areas.

The function elements for the various function sections 4 to 6, that is, for the switch section 4, for the heating and air-conditioning system section 5 and for the radio section 6 are held in a one-piece reinforcing frame 10. This results in a relatively compact constructional unit. At the level of the switch section 4, an instrument cross member 11 extends at a distance behind the switches transversely to the longitudinal direction of the vehicle through the cockpit/instrument panel arrangement 1. This instrument cross member 11 is part of the supporting structure of the passenger car and is used for reinforcing the instrument panel arrangement area. The instrument cross member extends along the whole vehicle width through the vehicle cockpit and is laterally connected with the two A-columns of the body structure of the passenger car.

Figure 2:
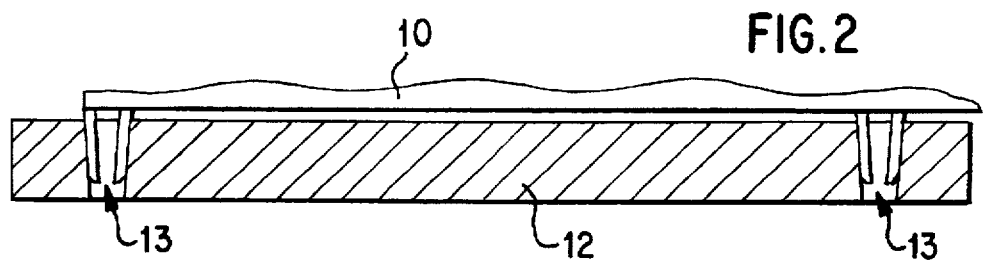
FIG. 2 is a sectional view of an energy absorber for the instrument panel arrangement according to FIG. 1, along the section line II—II in FIG. 1.

In order to prevent that, during a crash of the passenger car and a resulting head impact of vehicle occupants onto the cockpit, as a result of the instrument panel arrangement, impact energy, excessive accelerations are exercised on the various function elements and therefore on the reinforcing frame arranged in the direct vicinity of the instrument cross member, at the level of the instrument cross member 11 on a back side of the reinforcing frame 10, an energy absorber is provided in the form of a honeycomb structure 12. The honeycomb structure 12 extends along the whole width of the reinforcing frame 10 in parallel to the instrument cross member 11 and, in a simple manner, is fitted onto two holding pins 13 (FIG. 2) projecting away from a back side of the reinforcing frame 10. Each holding pin 13 is molded in one piece onto the reinforcing frame 10 consisting of plastic and has a fork-shaped design. As a result, each holding pin 13 has two legs which can be elastically bent relative to one another by a certain range. Preferably the diameter of each holding pin 13 is dimensioned such that it is adapted to the diameters of the honeycombs of the honeycomb structure in order to permit a frictionally engaged fitting of the honeycomb structure 12 onto the holding pins 13. The honeycomb structure 12 used as the energy absorber can therefore be mounted in a simple manner already during the preassembly of the cockpit instrument panel arrangement 1 onto the reinforcing frame 10 and, after the positioning and mounting of the instrument panel arrangement 1 in the passenger compartment is automatically arranged at the level of the instrument cross member 11.

The thickness of the honeycomb structure 12, which is aligned in the longitudinal direction of the vehicle, is aligned such that the available deformation path of the honeycomb structure is sufficient for absorbing sufficient energy in the case of a head impact of a passenger occupant onto the instrument panel arrangement in order to prevent unacceptable accelerations of the function elements within the reinforcing frame 10. The honeycomb structure 12 therefore has the purpose of reducing the entering of energy from the area of the passenger compartment. It is therefore prevented that the function elements—viewed in the longitudinal direction of the vehicle—can break out toward the front and result in a splintering-off of the covering panels 7, 8, 9.

In the case of another preferred embodiment of the invention, two separate holders are provided instead of the holding pins 13 for fixing the honeycomb structure, which holders have four legs. Otherwise, the holders have a construction which is identical to that of the holding pins.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Cockpit instrument panel arrangement for an interior of a motor vehicle to which at least one cross member of a motor vehicle supporting structure is assigned and including a central cockpit area in which several function elements are arranged, wherein the function elements are combined and held in a compact reinforcing frame, and wherein at least one energy absorber is arranged along a horizontal, longitudinally extending line of the vehicle directly behind the reinforcing frame and between the reinforcing frame holding the function elements and the cross member when viewed in a longitudinal direction of the vehicle, and being connected to only one of said reinforcing frame and said cross member.

2. Cockpit instrument panel arrangement according to claim 1, wherein the energy absorber is fastened on the reinforcing frame on its side facing the cross member.

3. Cockpit instrument panel arrangement according to claim 2, wherein a honeycomb structure is provided as the energy absorber.

4. Cockpit instrument panel arrangement according to claim 1, wherein said function elements include a switch section with a plurality of manually operable switch modules.

5. Cockpit instrument panel arrangement according to claim 4, wherein said function elements include a heating and air conditioning system section with a plurality of manually operable control elements for a vehicle heating and air conditioning system.

6. Cockpit instrument panel arrangement according to claim 5, wherein said function elements include a radio or computer section with manually operable radio or computer control elements.

7. Cockpit instrument panel arrangement according to claim 6, comprising covering panels covering free edge areas of the function elements facing a vehicle passenger space in an aesthetically attractive manner.

8. Cockpit instrument panel arrangement according to claim 5, comprising covering panels covering free edge areas of the function elements facing a vehicle passenger space in an aesthetically attractive manner.

9. Cockpit instrument panel arrangement according to claim 4, wherein said function elements include a radio or computer section with manually operable radio or computer control elements.

10. Cockpit instrument panel arrangement according to claim 4, comprising covering panels covering free edge areas of the function elements facing a vehicle passenger space in an aesthetically attractive manner.

11. Cockpit instrument panel arrangement according to claim 1, wherein said function elements include a heating and air conditioning system section with a plurality of manually operable control elements for a vehicle heating and air conditioning system.

12. Cockpit instrument panel arrangement according to claim 1, wherein said function elements include a radio or computer section with manually operable radio or computer control elements.

13. Cockpit instrument panel arrangement according to claim 1, comprising covering panels covering free edge areas of the function elements facing a vehicle passenger space in an aesthetically attractive manner.

14. Cockpit instrument panel arrangement for an interior of a motor vehicle to which at least one cross member of a motor vehicle supporting structure is assigned and including a central cockpit area in which several function elements are arranged, wherein the function elements are combined in a compact reinforcing frame, wherein at least one energy absorber is arranged in a longitudinal direction of the vehicle between the reinforcing frame and the cross member, wherein the energy absorber is fastened on the reinforcing frame on its side facing the cross member, wherein a honeycomb structure is provided as the energy absorber, and wherein the honeycomb structure is fitted onto holding pins of the reinforcing frame.

* * * * *